US008326100B2

(12) United States Patent
Chen et al.

(10) Patent No.: US 8,326,100 B2
(45) Date of Patent: Dec. 4, 2012

(54) LOW LOSS BROADBAND FIBER COUPLER TO OPTICAL WAVEGUIDE

(75) Inventors: Long Chen, Matawan, NJ (US); Christopher R. Doerr, Middletown, NJ (US); Young Kai Chen, Berkeley Heights, NJ (US)

(73) Assignee: Alcatel Lucent, Paris (FR)

( * ) Notice: Subject to any disclaimer, the term of this patent is extended or adjusted under 35 U.S.C. 154(b) by 254 days.

(21) Appl. No.: 12/891,516

(22) Filed: Sep. 27, 2010

(65) Prior Publication Data

US 2012/0076465 A1 Mar. 29, 2012

(51) Int. Cl.
*G02B 6/42* (2006.01)
*G02B 6/02* (2006.01)
*G02B 6/10* (2006.01)

(52) U.S. Cl. ................ 385/43; 385/27; 385/28; 385/14; 385/131; 385/132; 385/124; 264/1.24

(58) Field of Classification Search .................... 349/14, 349/13, 27, 28, 29, 30, 38, 39, 43, 25, 132, 349/129, 130, 131; 264/1.24
See application file for complete search history.

(56) References Cited

U.S. PATENT DOCUMENTS

| | | | | |
|---|---|---|---|---|
| 5,185,828 | A * | 2/1993 | van der Tol | 385/28 |
| 6,253,009 | B1 * | 6/2001 | Lestra et al. | 385/50 |
| 6,396,984 | B1 * | 5/2002 | Cho et al. | 385/43 |
| 7,274,835 | B2 * | 9/2007 | Panepucci et al. | 385/12 |
| 7,288,794 | B2 * | 10/2007 | Marsh et al. | 257/80 |
| 7,359,593 | B2 * | 4/2008 | Little | 385/30 |
| 8,064,741 | B2 * | 11/2011 | Cherchi et al. | 385/28 |
| 2009/0252456 | A1 | 10/2009 | Rasras | |
| 2012/0076465 | A1 * | 3/2012 | Chen et al. | 385/124 |

* cited by examiner

*Primary Examiner* — Brian Healy
(74) *Attorney, Agent, or Firm* — Hitt Gaines, PC

(57) ABSTRACT

An apparatus that comprises an optical-mode-converter. The optical-mode-converter includes a optical waveguide including a segment directly located on a substrate and a cantilevered segment located over said substrate and separated from said substrate by a cavity, and, said cantilevered segment includes a core surrounded by a cladding. The optical-mode-converter also includes a dielectric material filling said cavity and contacting said cantilevered segment over said cavity, wherein said dielectric material has a refractive index that is less than a refractive index of said cladding and that is no more than about 20 percent less than said refractive index of said cladding.

20 Claims, 6 Drawing Sheets

LOW LOSS BROADBAND FIBER COUPLER TO OPTICAL WAVEGUIDE

TECHNICAL FIELD OF THE INVENTION

The present invention is directed, in general, to an optical apparatus and, more specifically, to an optical-mode-converting structure and methods for operating and manufacturing the same.

BACKGROUND OF THE INVENTION

Waveguides and optical fibers are important components of optical communication systems. Waveguides, such as optical planar waveguides, are used in various optical components such as switches, couplers, splitters, filters, multiplexers and de-multiplexers, channelizers and chromatic polarization dispersion compensators. Optical fibers are used to transmit optical signal over a distance to and from these optical components. The strength of the optical signal transmitted through the optical communication system typically depends, at least in part, on how efficiently optical signals are transferred between optical waveguides and optical fibers.

SUMMARY

One embodiment includes an apparatus that comprises an optical-mode-converter. The optical-mode-converter includes an optical waveguide including a segment directly located on a substrate and a cantilevered segment located over said substrate and separated from said substrate by a cavity, and, said cantilevered segment includes a core surrounded by a cladding. The optical-mode-converter also includes a dielectric material filling said cavity and contacting said cantilevered segment over said cavity, wherein said dielectric material has a refractive index that is less than a refractive index of said cladding and that is no more than about 20 percent less than said refractive index of said cladding.

Another embodiment is a method for operating an apparatus. The method comprises coupling an optical signal between an optical fiber and an optical waveguide having a smaller mode size than the optical fiber, the coupling including changing a mode size of the optical signal by passing said optical signal through the above-described optical-mode-converter.

Another embodiment is a method of manufacturing an apparatus, which comprises fabricating an optical-mode-converter. Fabricating the optical-mode-converter includes providing a substrate having a first material layer on a second material layer, wherein said first material layer has a higher refractive index than said second material layer. Fabricating the optical-mode-converter also includes patterning said first material layer to form a core of an optical waveguide, and covering said core with a third material layer, wherein said refractive index of said core is greater than a refractive index of said third material layer. Fabricating the optical-mode-converter further includes patterning said second and said third material layers to form a cladding, and, patterning said substrate to form a cavity in said substrate such that portions of said core and said cladding form a cantilevered segment of the optical waveguide which is separated from said substrate by said cavity. Fabricating the optical-mode-converter includes providing a dielectric material to an end portion of said cantilevered segment over said cavity, wherein said dielectric material has a refractive index that is less than a refractive index of said cladding and that is no more than about 20 percent less than said refractive index of said cladding.

BRIEF DESCRIPTION OF THE DRAWINGS

The embodiments of the disclosure are best understood from the following detailed description, when read with the accompanying FIGUREs. Some features in the figures may be described as, for example, “top,” “bottom,” “vertical” or “lateral” for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which.

DETAILED DESCRIPTION

Figure 1:
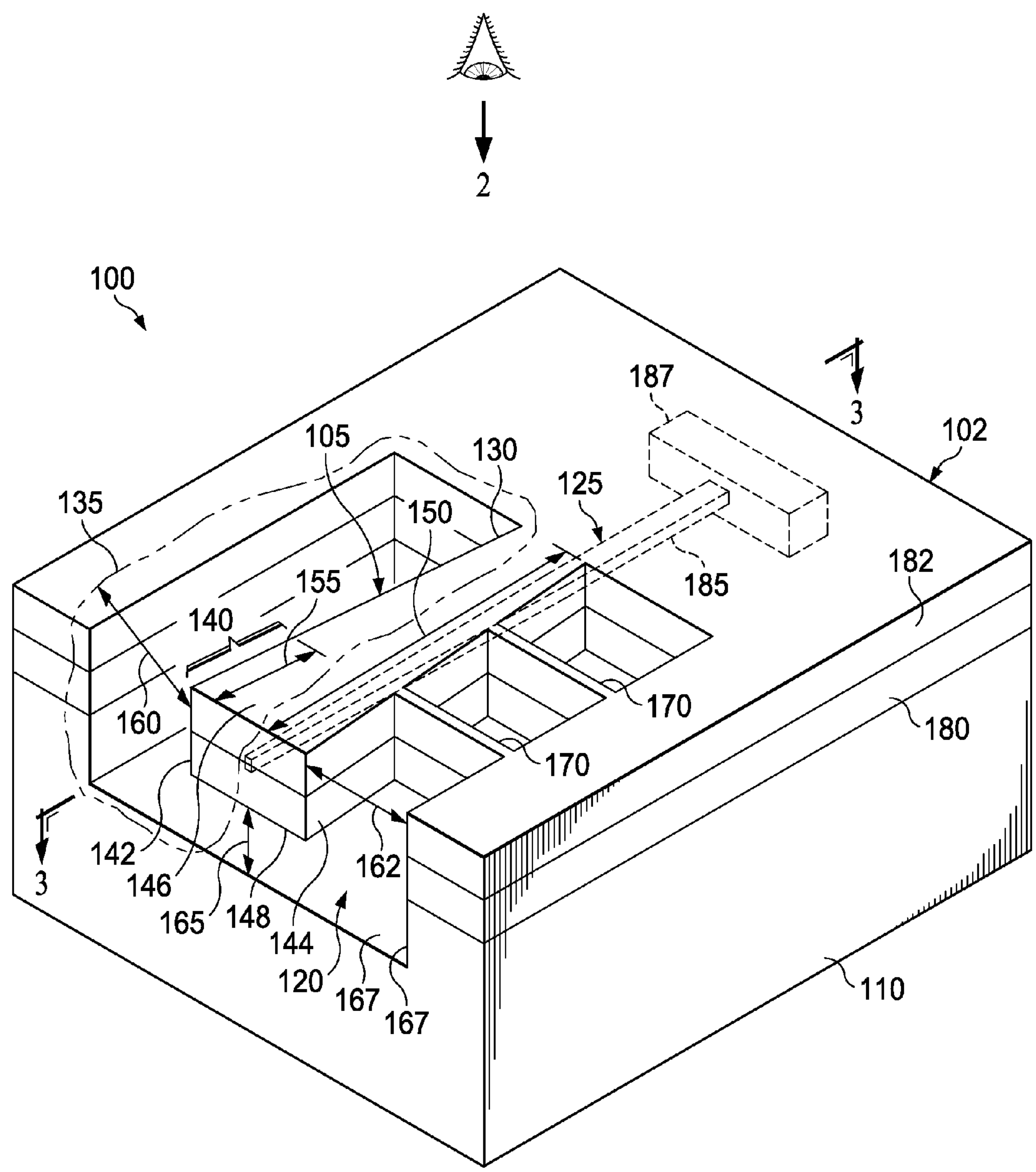
FIG. 1 presents a perspective view of an example apparatus of the present disclosure.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof. Additionally, the term, “or,” as used herein, refers to a non-exclusive or, unless otherwise indicated. Also, the various embodiments described herein are not necessarily mutually exclusive, as some embodiments can be combined with one or more other embodiments to form new embodiments.

Herein it is recognized that energy transfer between an optical waveguide and an optical fiber can be inefficient because the optical mode size in the optical fiber (e.g., several microns) is typically much larger than the optical mode in the waveguide (e.g., about one micron or less). Because of this size incompatibility, there can be substantial coupling losses when interfacing the large mode of the optical fiber to the compact mode of the waveguide. There is a longstanding need to improve the coupling efficiency between optical waveguides and optical fibers.

Grating couplers can have low coupling losses but have an intrinsic drawback of a narrow coupling bandwidth which severely limits their applications in broadband photonic circuits. Waveguide couplers near the chip facets can expand the waveguide mode for fiber butt-coupling. Adiabatically increasing the planar waveguide's dimensions to a cross-section comparable to the size of the fiber's mode can improve coupling efficiency. But the fabrication of such waveguides requires special wafers and processes and is not easily applicable to regular waveguides of small height.

Introducing an inverse taper, where the waveguide core is narrowed to a small tip at the fiber coupling end, can improve coupling by delocalizing the waveguide's optical mode. In some cases, however, the improvement in coupling efficiency is limited because of the limited cladding thicknesses practically achievable for certain materials (e.g., the buried silicon dioxide layer in a silicon-on-insulator wafer), thereby resulting in optical leakage through the cladding and into the substrate. The combination of inverse tapered waveguides with a secondary waveguide material (e.g., silicon oxynitride or polymers) can improve coupling efficiency. However, the coupling losses are still higher than desired and the use of secondary waveguide material can require complicated processes, such as deposition of thick films and additional lithography and etch steps, thereby increasing fabrication costs.

The combination of an inverse tapered waveguide with a cantilevered waveguide can help to reduce the problem of optical leakage into the substrate. As used herein the term cantilever refers to a projecting structure that is fixed at one end and free at the other end. As used herein cantilevered segment of a planar waveguide refers to an end segment of the planar waveguide that projects out from an edge of the substrate and is separated from the substrate by a gap or cavity. The combination of an inverse tapered waveguide and cantilevered waveguide, however, can still suffer from low coupling efficiency with standard cleaved single-mode fibers having a mode-diameter up to about 10 microns. At least in part, the low coupling efficiency is due to the dimensions of some cantilevered waveguides typically being much smaller than 10 microns. The smaller dimensions of such cantilevered waveguides, in turn, can be due to limitations in wafer production, fabrication processes, and, the need for compatibility with other photonic components on the same photonic integrated circuit (PIC) chip. Additionally, the large index contrast between the cantilevered waveguide's cladding (e.g., glass, in some cases) and the surrounding air or vacuum can cause the optical mode to be substantially confined inside the cladding and thus the planar waveguide's optical mode can be much smaller than the fiber mode.

Embodiments described herein mitigate these problems by contacting a cantilevered waveguide's cladding to a material that has a refractive index that is slightly lower than the index of the cladding. Hereinafter, that material is referred to as a near index-matching material or dielectric material. The near index-matching material helps to delocalize the waveguides optical mode to a size that substantially matches the size of optical fiber's mode, even though the cantilevered waveguide can have much smaller dimensions than the optical fiber's mode dimensions. Such a configuration leads to an efficient, broadband, and substantially polarization insensitive, optical coupling from a standard cleaved single-mode fiber to a planar waveguide. Another beneficial feature is that the fabrication of the optical-mode-converter requires substantially no additional deposition or lithography steps than already used for conventional PIC devices, and the optical-mode-converter is compatible with fiber packaging techniques.

Figure 2:
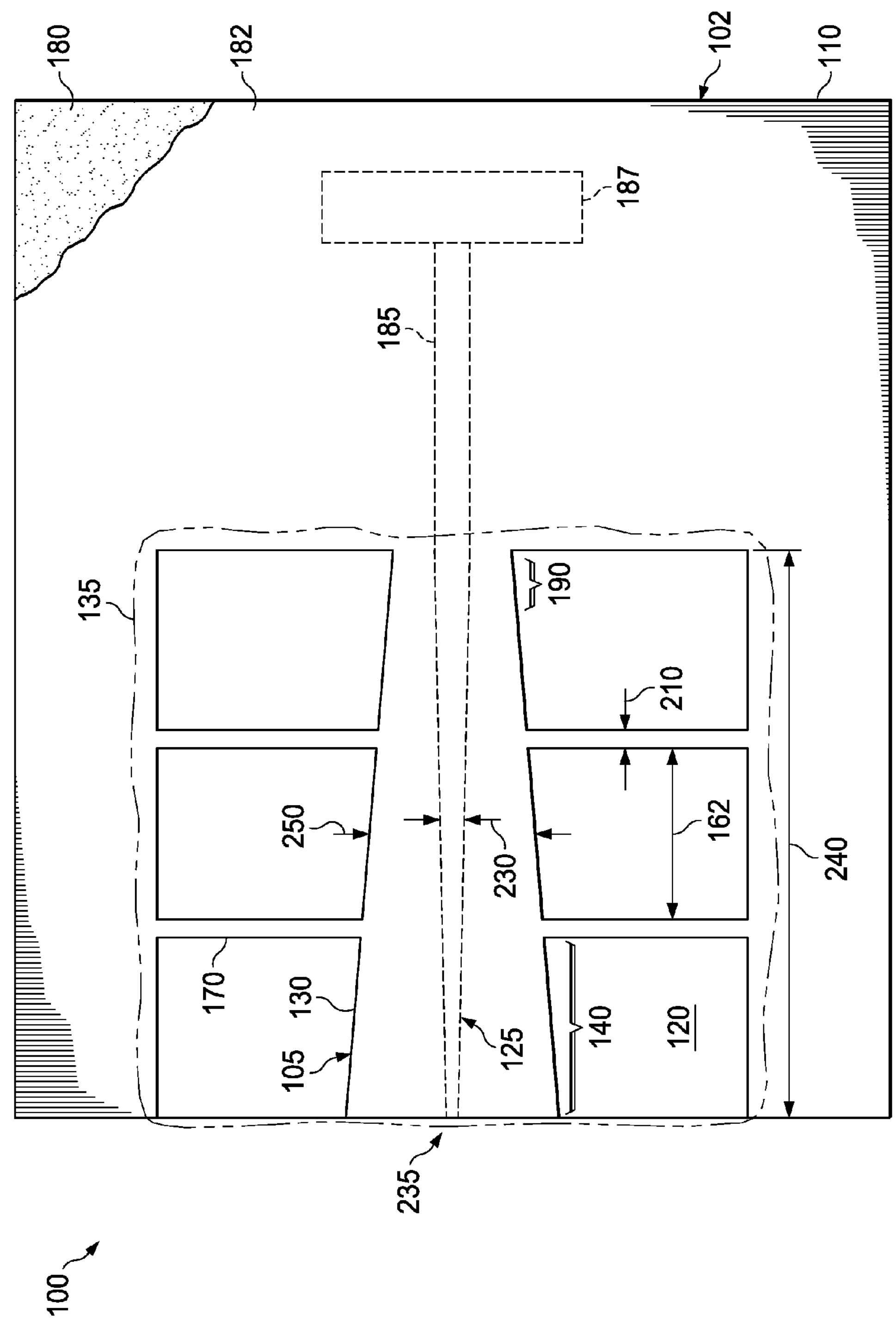
FIG. 2 presents a semitransparent plan view of an example apparatus similar to the apparatus of FIG. 1, along view line 2 shown in FIG. 1.
Figure 3:
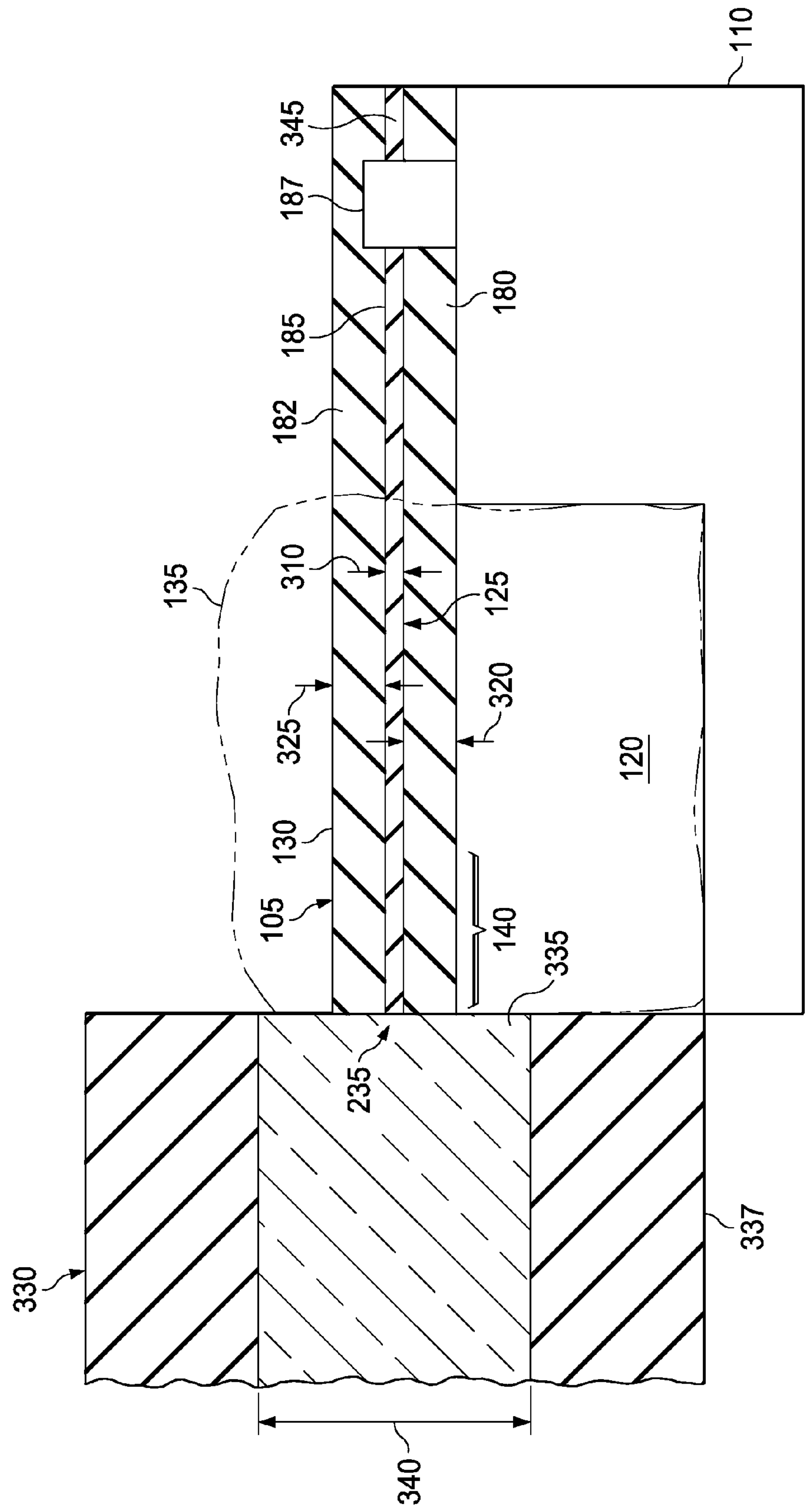
FIG. 3 presents a sectional view of an example apparatus similar to the apparatus of FIG. 1, along view line 3-3 shown in FIG. 1.

One embodiment of the disclosure is an apparatus. FIG. 1 presents a perspective view of an example embodiment of the apparatus 100 of the disclosure. FIGS. 2 and 3 present semi-transparent plan and sectional views of example apparatuses similar to the apparatus 100 of FIG. 1, along view line 2 and view lines 3-3, respectively, as depicted in FIG. 1.

In one embodiment, the apparatus 100 comprises an optical-mode-converter 102. The converter 102 includes a cantilever 105 (e.g., a planar or substantially planar cantilever in some cases) located over a substrate 110 and separated from the substrate 110 by a cavity 120. The cantilever 105 includes a core 125 surrounded by a cladding 130. The convertor 102 also includes a near index-matching material 135 that contacts an end portion 140 of the cantilever 105, the end portion 140 being located over the cavity 120. For clarity, only a portion of the near index-matching material 135 is depicted in FIG. 1. The near index-matching material 135 has a refractive index that is less than the refractive index of the cladding 130 as discussed above. In some preferred embodiments the near index-matching material 135 is no more than about 10 percent less, and in some case no more than about 5 percent less, and in some cases no more than about 2 percent less, and in some cases no more than about 1 percent less, than the refractive index of the cladding 130.

Embodiments of the substrate 110 can include substrates composed of semiconductor or dielectric material as well as multilayered combinations thereof. For example the substrate can comprise a semiconductor layer and a dielectric layer thereon, the dielectric layer serving as part of an optical cladding. Some preferred embodiments of the near index-matching material 135 include a flowable material because such materials facilitate contact to all surfaces of the end portion 140 and thereby improve mode expansion of the cantilever 105. For instance, in some cases the near index-matching material 135 can be a transparent liquid (e.g., Cargille™ immersion liquid with a refractive index of 1.44). For instance, a drop of liquid can be contacted to the end portion 140 and by capillary action can surround the end portion 140.

Some preferred embodiments of the near index-matching material 135 include a flowable material and that is also curable to a solid. The ability to cure the near index-matching material 135, after it has been flowed to contact the end portion 140, can facilitate stabilization of the contact between the material 135 and end portion 140, e.g., during subsequent fabrication and packaging, or, during the apparatus's 100 use. For instance, in some cases the near index-matching material 135 can be an epoxy (e.g., EPO-TEK® OG175 UV curable). A drop of epoxy can be contacted to the end portion 140, and again, by capillary action can surround the end portion 140. The epoxy can be allowed to cure to a solid, e.g., as aided by exposure to ultraviolet light.

In some embodiments, a refractive index of the core 125 is in a range from about 2.0 to 3.5, and the refractive index of the cladding 130 is in a range from about 1.4 to 1.5. For instance, in some cases the core 125 is composed of one of silicon nitride or silicon, and the cladding 130 is composed of silicon dioxide.

As illustrated in FIG. 1, to enhance mode expansion, in some embodiments the near index-matching material 135 preferable surrounds the end portion 140 of the cantilever 105. In some instances, however, the index-matching material 135 only contacts the cantilever's 105 sides 142, 144, top, 146 and bottom 148, of the end portion 140. In still other instances, the index-matching material 135 only contacts the bottom 148, or, contacts the sides 142, 144, and bottom 148, but not the top 146. In some cases, e.g., the cavity 120 is partially filled with the near index-matching material 135 such that only the bottom 148 is contacted. In some cases, e.g., the cavity 120 is filled with the near index-matching material 135 such that the bottom 148 and sides 142, 144 are contacted.

In some cases, of the entire long axis 150 of the cantilever 105 is in contact to the near index-matching material 135. In other cases, only the end portion 140, corresponding to a length 155 of at least about 30 percent of the long-axis 150 of the cantilever 105, is contacted by the near index-matching material 135. In other cases, the end portion 140 contacted by the index-matching material 135 correspond to a length 155 of at least about 20 microns, independent of total long axis 150 length.

In some cases, to facilitate mode expansion, it is desirable for the minimum thickness 160 of the near index-matching material 135 contacting the end portion 140 equals at least about 10 microns. In some cases, the dimensions of the cavity 120 are configured to facilitate having such minimum thickness 160. For instance, in some cases a lateral distance 162 and vertical depth 165 from the cantilever 105 to the nearest interior surface 167 defining the cavity can equal at least about the minimum thickness 160 (e.g., 10 microns in some cases).

In some embodiments, the cantilever 105 is supported by one or more beams 170 spanning the cavity 120 between the cantilever 105 and the substrate 110 (which can include portions of the layers that the cladding 130 is formed from). For instance, in some cases a plurality of beams 170 can be periodically separated along the long axis 150 of the cantilever 105.

In some cases, to mitigate the beams 170 from optically affecting the optical properties of the cantilever 105, it is desirable for the cantilever's 105 contact to the beams 170 be minimized. For instance, as illustrated in FIG. 2, embodiments of the beams can have a width 210 of about 1 micron wide and be separated from each other by a distance 220 of about 25 microns. In other cases, however, for certain core 125 designs a large portion of the cantilever 105 can be contacted by the beams 170.

Similarly, to mitigate the beams 170 from optically affecting the optical properties of the cantilever 105, in some cases it is desirable for the beams 170 to not contact the end portion 140 of the cantilever.

In some cases, the beams 170 laterally span the cavity 120, and are referred to a lateral support beams. As illustrated in FIG. 2, in some cases, the lateral support beams 170 can symmetrical distributed on either side of the cantilever 105, although asymmetric distributions can be used. In some cases, the lateral support beams 170 can be formed from the same material layers 180, 182 (e.g., one or both of upper and lower cladding layers of silicon dioxide) that the cladding 130 is formed from. In some cases, the beams 170 can continuously connect the cantilever 105 across the cavity 120 to one or both material layers 180, 182. That is, the cladding 130 and the beams 170 are continuous from the same pieces of same material layers 180, 182.

As illustrated in FIG. 2, in some embodiments, to facilitate optical mode expansion, the core 125 can be a tapered core. For instance, in some cases, a smallest width 230 of tapered core is located towards a tip or facet 235 of the cantilever 105 (e.g., an inverse taper). For example, in some cases, the core's 125 lateral width 230 tapers continuously from about 500 to 80 nanometers over a long axis 150 distance 240 in the cantilever 105 (e.g. a distance 240 in a range from about 100 to 300 microns) in a direction towards the tip or facet 235, and, the core's vertical width 310 (FIG. 3) can be constant in a range of from about 500 to 80 nanometers. In other cases, however, both the lateral width 230 and vertical width 310 can be constant (e.g., both in a range from about 80 to 500 nanometers, and more preferably, from about 80 to 200 nanometers).

As also illustrated in FIG. 2, in some embodiments, to facilitate optical mode expansion, the cladding 130 is a tapered cladding. For instance, in some cases, a largest width 250 of the tapered cladding 130 can be located towards the tip or facet 235 of the cantilever 105. For example, in some cases, the cladding's 130 lateral width 250 tapers continuously from about 6 to 3 microns over the long axis 150 distance 240 in a direction away from the tip or facet 235, and, the cladding's vertical widths 320, 325 (FIG. 3) can be constant in a range of from about 1 to 5 microns. In other cases, however, both the lateral width 250 and vertical widths 320, 325 can be constant.

As further illustrated in FIG. 3, embodiments of the apparatus 100 can further include an optical fiber 330 wherein a core 335 of the optical fiber 330 can be directly end-coupled to the core 125 at the tip or facet 235 of the end portion 140. For instance, the optical fiber 330 can be a standard-cleaved single mode fiber having an optical mode size in a range of about 8 to microns, e.g., transmitted through the core 335 having a diameter 340 in a range of about 7 to 10 microns. One skilled in the art would understand the types and dimension of cladding 337 that could be used to surround the fiber core 335.

As further illustrated in FIG. 1, embodiments of the apparatus 100 can further include an optical waveguide 185 (e.g., a planar or substantially planar waveguide in some cases) located on the substrate 110. For instance, in some cases, the core 125 of the cantilever 105 is continuous with the waveguide 185 of the apparatus 100. In some cases, the waveguide 185 can have an optical mode size that is substantially the same as the non-expanded optical mode size (e.g., in a range from about 0.1 to 1 microns) as in the core 125 of the cantilever 105 at the supported end 190 of cantilever 105 (FIG. 1). As further illustrated in FIG. 1, in some embodiments, the cantilever 105 can be coupled via the waveguide 185 to an integrated circuit 187 (e.g., a photonic integrated circuit) of the apparatus 100, and, the apparatus 100 can be configured as an optoelectronic device in an optical fiber communication system.

In another embodiment, the apparatus 100 comprises an optical-mode-converter 102 for coupling to an optical waveguide. With continuing reference to FIGS. 1-3, the converter 102 includes a cantilevered segment 105 of the optical waveguide that is located over a substrate 110 and separated from the substrate 110 by a cavity 120. The cantilevered segment 105 and the optical waveguide itself include a semiconductor optical core 125 that is axially or laterally surrounded by an optical cladding 130. The convertor 102 also includes a near index-matching material 135, i.e., a dielectric material 135, which contacts a terminal end portion 140 of the cantilever 105, the terminal end portion 140 being located over the cavity 120. For clarity, only a portion of the near index-matching material 135 is depicted in FIG. 1. The near index-matching material 135 has a refractive index that is less than the refractive index of the cladding 130 and that is no more than about 20 percent less than the refractive index of the cladding 130. In some preferred embodiments the near index-matching material 135 is no more than about 10 percent less, and in some case no more than about 5 percent less, and in some cases no more than about 2 percent less, and in some cases no more than about 1 percent less, than the refractive index of the cladding 130.

In some cases, the dielectric material 135 axially surrounds an end portion 140 of the cantilevered segment 105. In some cases, a length 155 of the end portion 140 contacted by the dielectric material 135 corresponds to at least about 30 percent of a long-axis length 150 of the cantilevered segment 105. In some cases, the end portion 140 contacted by the dielectric material 135 corresponds to an at least about 20 micron length 155 of a long-axis length 150 of the cantilevered segment 105. In some cases, the dielectric material 135 contacting the end portion 140 has a thickness 160 of at least about 10 microns. In some cases, the cantilevered segment 105 laterally connects directly to one or more beams 170 spanning the cavity 120 between the cantilevered segment 105 and one or more walls of the cavity 120. In some cases, the core 125 is a tapered core, a smallest width 230 of the tapered core located towards a tip 235 of the cantilevered segment 105. In some cases, the cladding 130 is a tapered cladding, a largest width 250 of the tapered cladding 130 being located towards a tip 235 of the cantilevered segment 105. In some cases, the apparatus 100 further includes an optical fiber 330 wherein a core 335 of the optical fiber 330 is directly end-coupled to the core 125 at a tip 235 of the end portion 140. In some cases, the segment 185 located directly on the substrate 110 optically end couples to an integrated circuit 187 located on the substrate 110, and, the apparatus 100 is configured as an optoelectronic device in an optical fiber communication system.

Figure 4A:
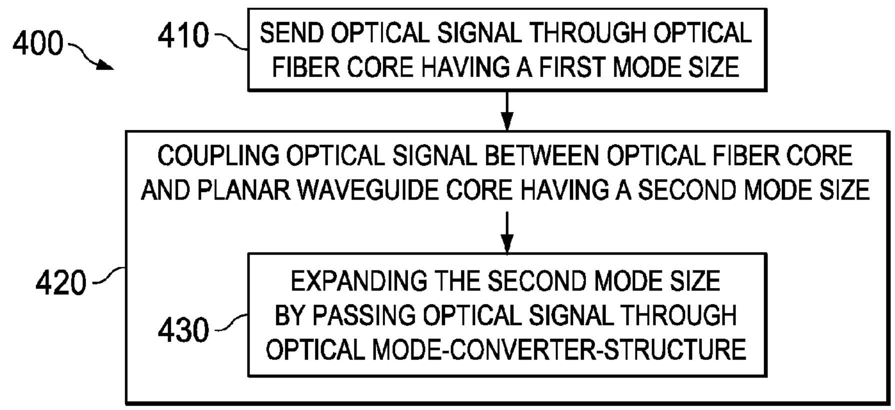
FIG. 4A presents a flow diagram illustrating an example method for operating an apparatus of the disclosure, e.g., the apparatuses of FIGS. 1-3.

Another embodiment is a method of operating an apparatus. FIG. 4A presents a flow diagram illustrating an example method 400 for operating an apparatus of the disclosure. Any of the embodiments of the apparatus 100 and its component parts, including the embodiments of the converter 102, discussed herein can be operated in the method 400.

With continuing reference to FIGS. 1-3 throughout, the method 400 includes a step 410 of sending an optical signal through a core 335 of an optical fiber 330 having a first mode size. In some embodiments, the optical signal includes an analogue or a digital signal that is up-converted to optical wavelengths (e.g., about 1300 to 1700 nm) such as commonly used in optical communication systems. However, the optical signal could include other wavelengths of light, and, can have information encoded in other fashions well-known to those skilled in the art. In some embodiments, e.g., the first mode size of the optical fiber is a range ranges from about 8 to 11 microns.

The method also includes a step 420 of coupling the optical signal between (e.g., to or from) the optical fiber core 335 and an optical waveguide 185 having a different second mode size. In some embodiments, e.g., the second mode size is in a range from about 0.1 to 1 micron.

Coupling (step 420) include a step 430 of expanding the second mode size to substantially match the first mode size (for example, within about 20 percent, and more preferably, within about 10 percent) by passing the optical signal through an optical-mode-converter 102.

As discussed above, the converter 102 includes a cantilever 105 located over a substrate 110 and is separated from the substrate 110 by a cavity 120, and, also includes a near index-matching material 135 that contacts an end portion 140 of the cantilever 105. Any of the embodiments of the optical-mode-converter 105 discussed herein can be used to facilitate the mode-size matching.

Figure 4B:
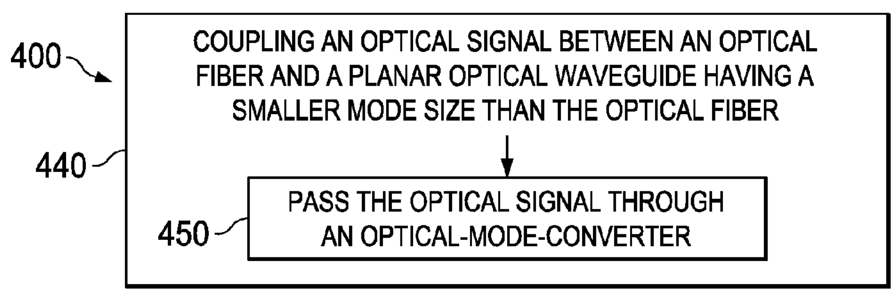
FIG. 4B presents a flow diagram illustrating another example method for operating an apparatus of the disclosure, e.g., the apparatuses of FIGS. 1-3.

FIG. 4B presents a flow diagram illustrating another example method 400 for operating an apparatus of the disclosure. The method 400 includes a step 440 of coupling an optical signal between an optical fiber 330 and an optical waveguide 185 having a smaller mode size than the optical fiber 330, the coupling including changing a mode size of the optical signal by a step 450 of passing the optical signal through an optical-mode-converter 102. The optical-mode-converter 102 includes a cantilevered segment 105 of the waveguide 185 located over a substrate 110 and separated from the substrate 110 by a cavity 120, and, the waveguide 185 includes a core 125 surrounded by a cladding 130. The optical-mode-converter 102 includes a dielectric material 135 that contacts a terminal end portion 140 of the cantilevered segment 105 over the cavity 120. The dielectric material 135 has a refractive index that is less than a refractive index of the cladding 130 and that is no more than about 20 percent less than the refractive index of the cladding 130. In some cases, the mode size is in a range from about 8 to 11 microns in the optical fiber 330 and the second mode size is in a range from about 0.1 to 1 microns in the waveguide 185.

Some example results, obtained when using the apparatus in accordance with the method 400 of FIG. 4A or 4B, are presented below:

One simulation experiment considered the case when the cantilever 105 includes a core 125, cladding 130 and near index-matching material 135 of silicon nitride, silicon dioxide and fluid, respectively, with refractive indexes of 2, 1.45 and 1.447, respectively. The core's width 230 tapered from 500 to 80 nanometers over a 300 micron length 240 of the cantilever 105 towards the tip or facet 235 and the core's vertical width 310 was a constant 400 nanometers. The cladding's lateral width 250 tapered from 6 to 3 microns over the length 240 away from the tip or facet 235 and the vertical widths 320, 325 were both about 2 microns for a total vertical width of about 4 microns. The optical response of the proposed coupler 102, when coupled to a single mode fiber 330 having a diameter 340 of 8.2 microns and optical mode diameter of 10.4 microns, was simulated using a three-dimensional finite-difference beam-propagation method. The calculated optical coupling loss was estimated to equally only about 0.5 dB/facet. Similar small coupling losses were estimated for the case for a silicon core 125 having a width 230 tapered from 80 to 500 nanometers over a 300 micron length 240 of the cantilever 105 towards the tip or facet 235 and a constant vertical width 310 of about 220 nanometers. In comparison without the near index-matching material 135 present (e.g., air surrounding the cladding 130), the loss was estimated to be about 4 dB/facet.

In an experiment, a test converter 102 was fabricated, to specifications similar to that described above, using a silicon nitride core. Differences included the cantilever 105 being 150 microns in length 240, and, the use of 1 micron wide 210 lateral support beams 170 separated by a distance 220 of 25 microns connected the cantilever 105 to the rest of the glass layers 180, 182. A fluid with a refractive index of 1.447 was used as the near index-matching material 135.

Light from a tunable laser (in a range from 1480 to 1580 nanometers) was sent through a fiber polarization controller and delivered to the converter's tip or facet 235 through a standard cleaved single mode fiber 330 (Corning® SMF-28™). The output at the optical-mode-converter's other facet (e.g., at end 190) was connected to a passive waveguide 185 and then a second reversed optical-mode-converter 102. The output at the second optical-mode-converter was then collected with another fiber 330 and measured with an optical power-meter. The fiber-to-fiber transmission bypassing the test chip was calibrated as a baseline (1.5 dB loss at 1550 nm for the polarizer and all connectors). Additional silicon nitride waveguide 185 structures were measured to extract the waveguide propagation loss for both polarizations (e.g., ~0.8 dB/cm at 1550 nm for both polarizations). Light transmission through the test converter 102 was measured and the coupling loss per facet was determined by subtracting the fiber-to-fiber baseline losses and a 6-mm-long silicon nitride waveguide's 185 losses from the transmission, and, dividing the result by a factor of two.

Figure 5:
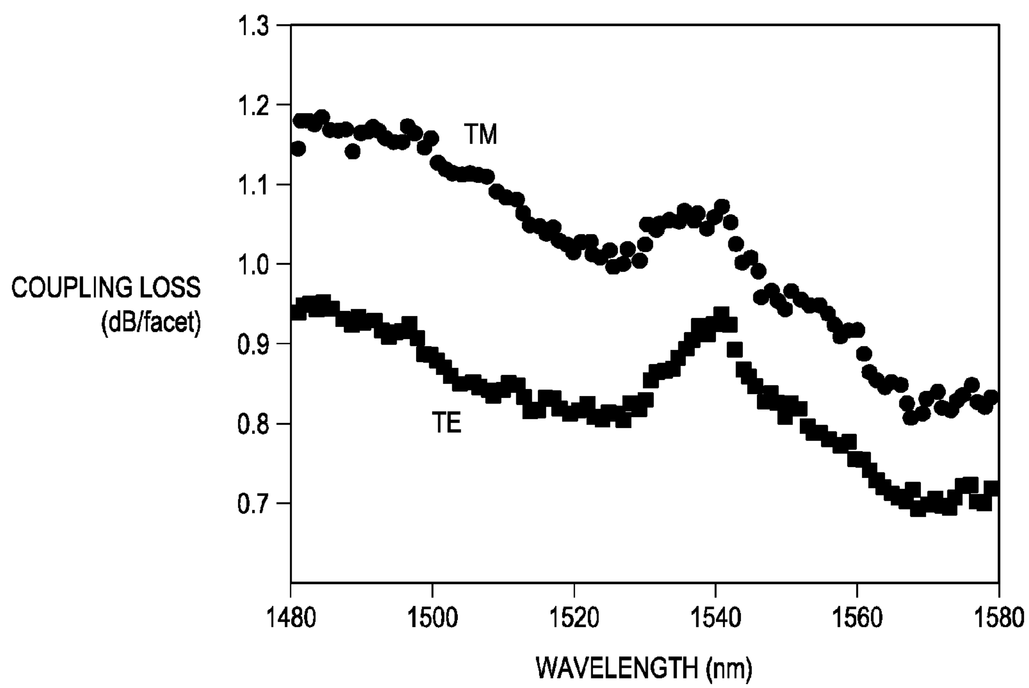
FIG. 5 presents example coupling losses for an example test apparatus of the disclosure for Transverse Magnetic (TM) and Transverse Electric (TE) light polarizations.

FIG. 5 shows an example of the measured coupling loss between the fiber 330 and the above-described test converter 102. Over a 100 nm wavelength range, the coupling losses were less than about 1.2 dB/facet for Transverse Magnetic (TM) polarized light, and, less than about 1.0 dB/facet for Transverse Electric (TE) polarized light. The coupling loss was about 0.7 dB/facet for the TE polarization at 1580 nm. In comparison, without the near index-matching material 135 present, the same fiber coupler has a coupling loss of about 5 dB/facet, which is more than about 4 dB higher than with the material 135 present.

In another experiment, a second test converter 102 was fabricated, similar to that described above, with differences that a silicon core 125 with a constant vertical width 310 of about 220 nanometers and the cantilever's length 240 was about 300 microns.

A total insertion loss at about 1550 nm of about 4.2 dB for TE polarization, and about 5.2 dB for TM polarization was measured for the second test converters 102. The total losses included two converters and 6 mm long waveguide 185 (consisting of 1.2 micron wide waveguide 185 in straight sections and 0.6 micron wide waveguide 185 in bends). Therefore the absolute upper limits of the coupling loss were about 2.1 dB/facet (TE) and 2.6 dB/facet (TM), if the Si waveguide 185 has substantially zero propagation loss. The propagation loss was estimated to be about from about 1.4 to 2.0 dB/cm based on results from previous batches with similar processes. From this, the coupling loss between the fiber 330 and the optical-mode-converter 102 was estimated to be from about 1.5 to 2.0 dB/facet. The losses can be higher than the losses obtained when using, e.g., a test optical-mode-converter 102 with the silicon nitride core 125 and waveguides 185, because of silicon's much larger refractive index and larger scattering losses of the inverse tapered silicon core 125.

Figure 6:
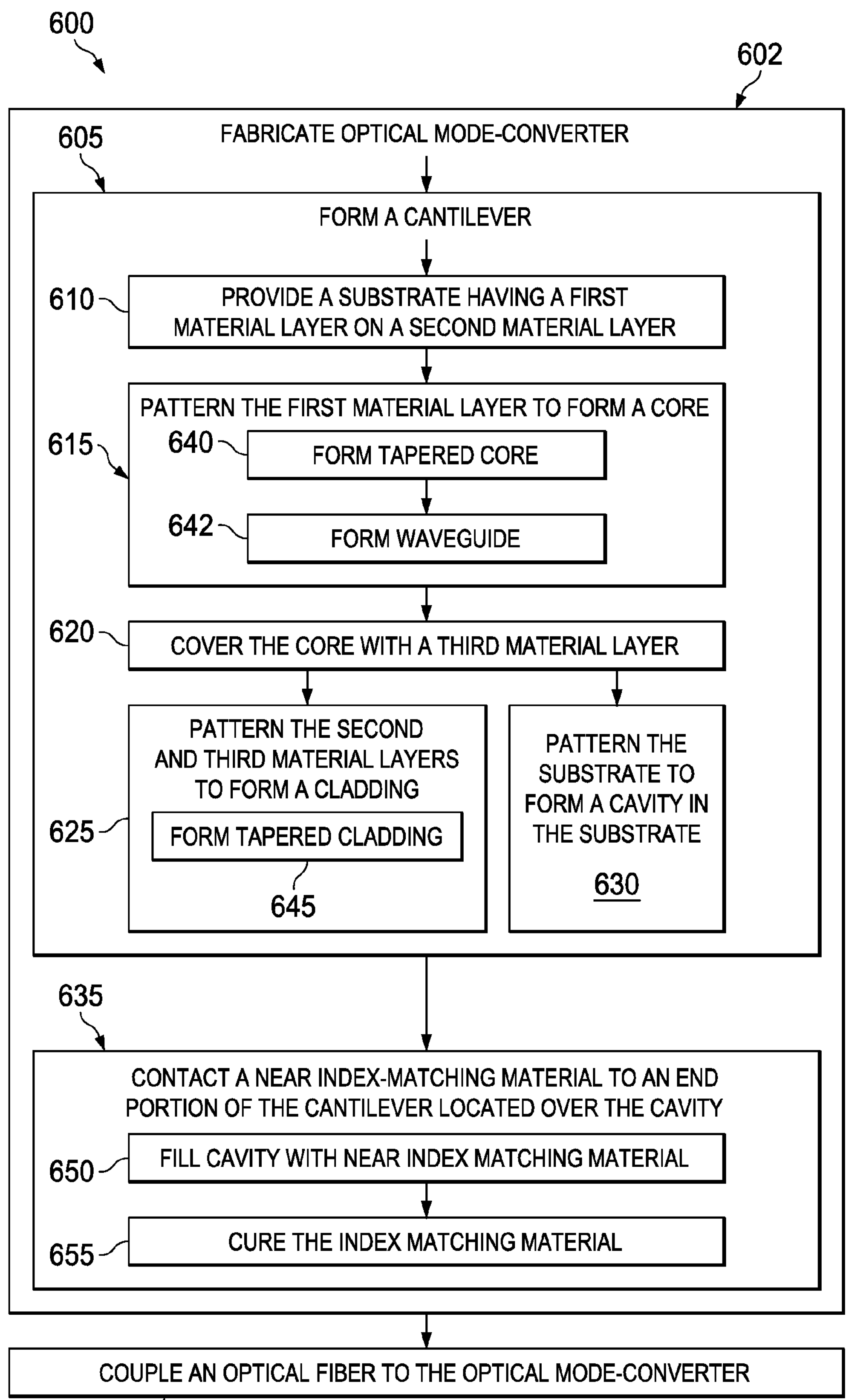
FIG. 6 presents a flow diagram illustrating an example method for manufacturing an apparatus of the disclosure e.g., the any of the apparatuses of FIGS. 1-5.

Another embodiment is a method for manufacturing an apparatus. FIG. 6 presents a flow diagram illustrating an example method 600 for manufacturing an apparatus of the disclosure. Any of the embodiments of the apparatus 100 and its component parts discussed herein and in the context of FIGS. 1-5 can be manufactured by the method 600.

With continuing reference to FIGS. 1-3 throughout, the method 600 comprises a step 602 of fabricating an optical-mode-converter 102. Fabricating optical-mode-converter 102 (step 602) includes a step 605 of forming a cantilever 105.

Forming the cantilever 105 (step 605) includes a step 610 of providing a substrate 110 having a first material layer 345 (FIG. 3) on a second material layer 180 (FIG. 3), wherein the first material layer 345 (e.g., a core layer) has a higher refractive index than the second material layer 180 (e.g., a cladding layer). A silicon-on-insulator substrate is an example substrate 110, where. e.g., the second material layer 180 is silicon oxide, and the first material layer 345 is silicon. In some cases the second material layer 180 can be a buried silicon oxide. In another example, the first material layer 345 is silicon nitride, and the second material layer 180 is silicon dioxide. One skilled in the art would be familiar with the processes that could be used to form these material layers.

Forming the cantilever 105 (step 605) also includes a step 615 of patterning the first material layer 345 to form a core 125. One skilled in the art would be familiar conventional lithographic procedures and etching procedures to pattern the layer 345 in accordance with step 615.

Forming the cantilever 105 (step 605) further includes a step 620 of covering the core with a third material layer 182, wherein the refractive index of the core 125 is greater than a refractive index of the third material layer 182. Again, one skilled in the art would be familiar with the processes that could be used to form the material layer.

Forming the cantilever 105 (step 605) also includes a step 625 of patterning the second and third material layers 180, 182 to form a cladding 130. For instance, a conventional trench patterning process, such as a plasma etch process, as typically used to create a smooth coupling tip or facet 235, can be used to form the cladding 130.

Forming the cantilever 105 (step 605) also includes a step 630 of patterning the substrate 110 to form a cavity 120 in the substrate 110, such that portions of the core 125 and the cladding 130 form the cantilever 105 which is separated from the substrate 110 by the cavity 120. For instance, in some cases, an isotropic silicon dry etch, e.g., using xenon difluoride or sulfur hexafluoride, can be used as part of step 630 to form the cavity 120. In some cases, the cavity forming patterning step 630 is performed after patterning the second and third material layers 180, 182 in step 625. Although less desirable, in some cases, step 630 can be performed before step 625. For instance, a back-side etch of portions of the substrate 110 could be done as part of step 630 can be followed by a front-side etch of portions of the material layers 180, 182 as part of step 625.

Fabricating the converter 102 (step 602) further includes a step 635 of contacting a near index-matching material 135 to an end portion 140 of the cantilever 105 located over the cavity 120. The near index-matching material 135 has a refractive index that is less than a refractive index of the cladding 130 and the material's 135 refractive index is no more than about 20 percent less than the refractive index of the cladding 130.

A number of optional steps are further illustrated in FIG. 6. In some embodiments, patterning the first material layer 180 in step 615 to form the core 125 can include a step 640 of forming the core 125 with a tapered width 230, e.g. to form an inverse tapered core. In some embodiments, the first material patterning step 615 can include a step 642 of patterning a waveguide 185 of the apparatus 100.

In some embodiments, patterning the second and third material layers 180, 182 in step 625 to form the cladding 130 further includes a step 645 of forming the cladding 130 with a tapered width 250. In some embodiments, the patterning step 625 can also include forming beams 170 that spans the cavity 120 and connects the cladding 130 to un-patterned portions of the second and third material layer 180, 182.

In some embodiments, contacting the near index-matching material 135 to the end portion 140 in step 635 includes a step 650 of filling the cavity 120 with the near index-matching material 135. For instance, a fluid near index-matching material 135 can be flowed to the cavity 120 in step 650 and by capillary action surrounds the end portion 140. In some embodiment, contacting the near index-matching material 135 to the end portion 140 in step 635 includes a step 655 of curing the near index-matching material 135. For instance, an epoxy near index-matching material 135 can be flowed to the end portion 140 and then in step 655 exposed to an ultraviolet light to cure the epoxy near index-matching material 135.

The method 600 can include numerous additional steps to complete the manufacture of the apparatus 100. For instance, the method 600 can further include a step 660 of coupling an optical fiber 330 to the converter 102. For instance, optical adhesives, such as epoxies, can be used to facilitate coupling of the optical fiber 330 to the tip or facet 235 of the cantilever 105 as part of step 660.

Figure 7:
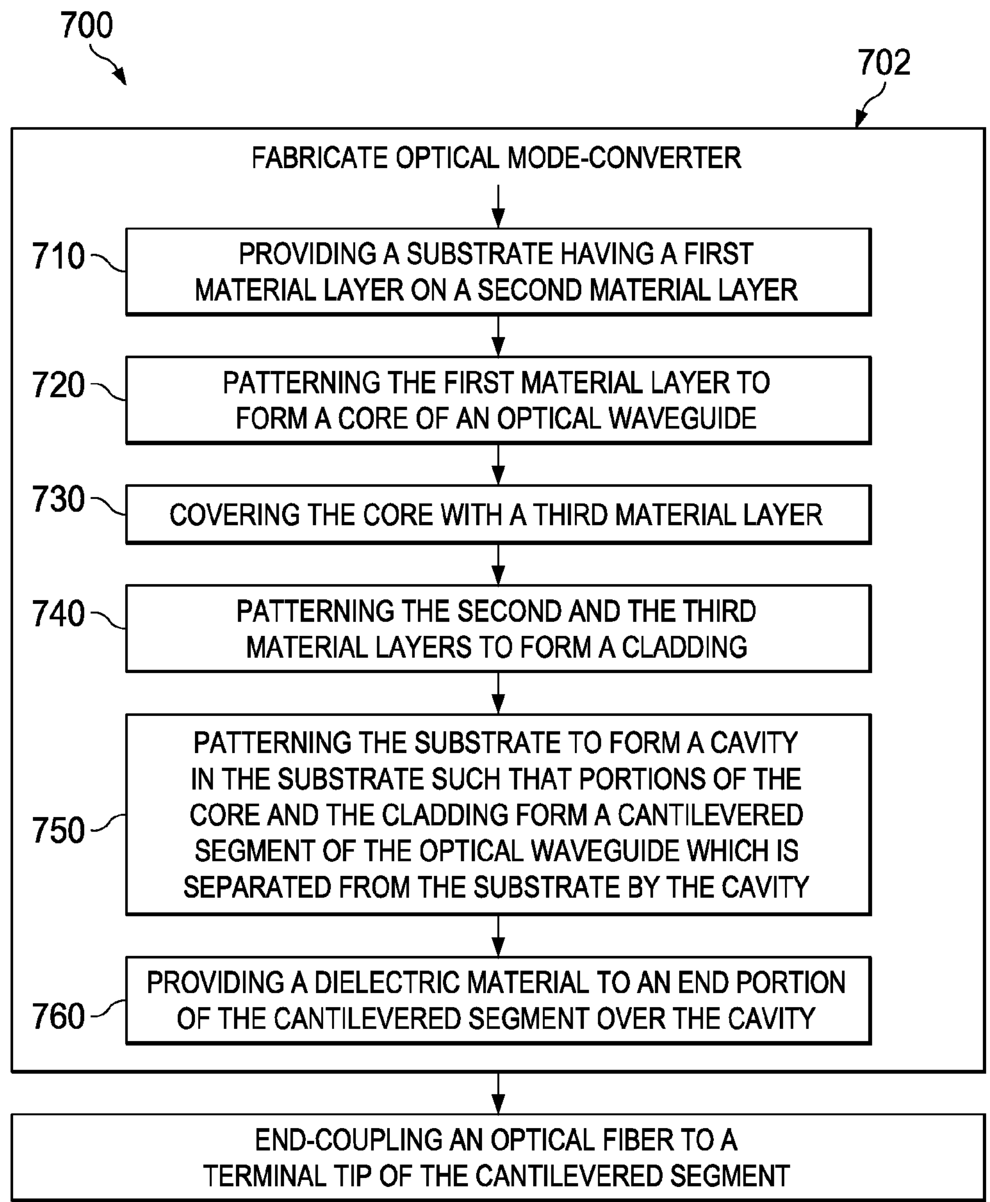
FIG. 7 presents a flow diagram illustrating another example method for manufacturing an apparatus of the disclosure e.g., the any of the apparatuses of FIGS. 1-5.

FIG. 7 presents a flow diagram illustrating another example method 700 for manufacturing an apparatus of the disclosure. With continuing reference to FIGS. 1-3, the method 700 comprises a step 702 of fabricating an optical-mode-converter 102.

Fabricating optical-mode-converter 102 (step 702) includes a step 710 of providing a substrate 110 having a first material layer 345 on a second material layer 180, wherein said material layer 345 has a higher refractive index than the second layer 180. Fabricating optical-mode-converter 102 (step 702) includes a step 720 of patterning the first material layer 345 to form a core 125 of an optical waveguide, and, a step 730 of covering the core 125 with a third material layer 182, wherein the refractive index of the core 125 is greater than a refractive index of the third material layer 182. Fabricating optical-mode-converter 102 (step 702) includes a step 740 of patterning the second and the third material layers 180, 182 to form a cladding 130, and, a step 750 of patterning the substrate 110 to form a cavity 120 in the substrate 110 such that portions of the core 125 and the cladding 130 form a cantilevered segment 105 of the optical waveguide 185 which is separated from the substrate 110 by the cavity 120. Fabricating optical-mode-converter 102 (step 702) also includes a step 760 of providing a dielectric material 135 to an end portion 140 of the cantilevered segment 105 over the cavity 120, wherein the dielectric material 135 has a refractive index that is less than a refractive index of the cladding 120 and that is no more than about 20 percent less than the refractive index of the cladding 120.

In some cases, patterning the first material layer 345 (step 720) further includes forming the core 125 with a tapered width 230. In some cases, patterning the second and the third material layers 180, 182 (step 740) further includes forming the cladding 130 with a tapered lateral width 250. In some cases, patterning the second and the third material layers 180, 182 (step 740) further includes forming beams 170 that span a part of the cavity 120 and connect the cladding 130 to one or more walls of the cavity 120. In some cases patterning the substrate 110 to form the cavity 120 (step 750) includes performing a substantially isotropic etch of the substrate 110. In some cases, providing the dielectric material 135 to the end portion (step 760) includes filling the cavity 120 with the dielectric material 135.

In some cases the method 700 further includes a step 770 of end-coupling an optical fiber 330 to a terminal tip 235 of the cantilevered segment 105.

Although the present invention has been described in detail, those skilled in the art should understand that they can make various changes, substitutions and alterations herein without departing from the scope of the invention.

What is claimed is:

1. An apparatus, comprising:

an optical-mode-converter, including:

an optical waveguide including a segment directly located on a substrate and a cantilevered segment located over said substrate and separated from said substrate by a cavity, and, said cantilevered segment includes a core surrounded by a cladding; and a dielectric material filling said cavity and contacting said cantilevered segment over said cavity, wherein said dielectric material has a refractive index that is less than the refractive index of said cladding and that is no more than about 20 percent less than said refractive index of said cladding.

2. The apparatus of claim 1, wherein said dielectric material is no more than about 2 percent less than said refractive index of said cladding.

3. The apparatus of claim 1, wherein said dielectric material axially surrounds an end portion of said cantilevered segment.

4. The apparatus of claim 1, wherein a length of said end portion contacted by said dielectric material corresponds to at least about 30 percent of a long-axis length of said cantilevered segment.

5. The apparatus of claim 1, wherein said end portion contacted by said dielectric material corresponds to an at least about 20 micron length of a long-axis length of said cantilever.

6. The apparatus of claim 1, wherein said dielectric material contacting said end portion has a thickness of at least about 10 microns.

7. The apparatus of claim 1, wherein said cantilevered segment laterally connects directly to one or more beams spanning said cavity between said cantilevered segment and one or more walls of said cavity.

8. The apparatus of claim 1, wherein said core is a tapered core, a smallest width of said tapered core located towards a tip of said cantilevered segment.

9. The apparatus of claim 1, wherein said cladding is a tapered cladding, a largest width of said tapered cladding being located towards a tip of said cantilevered segment.

10. The apparatus of claim 1, further including an optical fiber wherein a core of said optical fiber is directly end-coupled to said core at a tip of said end portion.

11. The apparatus of claim 1, wherein said segment located directly on said substrate optically end couples to an integrated circuit located on said substrate, and, said apparatus is configured as an optoelectronic device in an optical fiber communication system.

12. A method of operating an apparatus, comprising:

coupling an optical signal between an optical fiber and an optical waveguide having a smaller mode size than the optical fiber, the coupling including changing a mode size of the optical signal by passing said optical signal through an optical-mode-converter, said optical-mode-converter including:

a cantilevered segment of the planar waveguide located over a substrate and separated from said substrate by a cavity, and, said planar waveguide includes a core surrounded by a cladding; and a dielectric material that contacts a terminal end portion of said cantilevered segment over said cavity, wherein said dielectric material has a refractive index that is less than a refractive index of said cladding and that is no more than about 20 percent less than said refractive index of said cladding.

13. The method of claim 12, wherein said mode size is in a range from about 8 to 11 microns in the optical fiber and said second mode size is in a range from about 0.1 to 1 microns in the waveguide.

14. A method of manufacturing an apparatus, comprising:

fabricating an optical-mode-converter, including:

providing a substrate having a first material layer on a second material layer, wherein said first material layer has a higher refractive index than said second material layer;

patterning said first material layer to form a core of an optical waveguide;

covering said core with a third material layer, wherein said refractive index of said core is greater than a refractive index of said third material layer;

patterning said second and said third material layers to form a cladding; and patterning said substrate to form a cavity in said substrate such that portions of said core and said cladding form a cantilevered segment of said optical waveguide which is separated from said substrate by said cavity; and providing a dielectric material to an end portion of said cantilevered segment over said cavity, wherein said dielectric material has a refractive index that is less than the refractive index of said cladding and that is no more than about 20 percent less than said refractive index of said cladding.

15. The method of claim 14, wherein patterning said first layer further includes forming said core with a tapered width.

16. The method of claim 14, wherein patterning said second and said third material layer further includes forming said cladding with a tapered lateral width.

17. The method of claim 14, wherein patterning said second and said third material layers further includes forming beams that span a part of said cavity and connect said cladding to one or more walls of said cavity.

18. The method of claim 14, wherein patterning said substrate to form said cavity includes performing a substantially isotropic etch of said substrate.

19. The method of claim 14, wherein providing said dielectric material to said end portion includes filling said cavity with said dielectric material.

20. The method of claim 14, further including end-coupling an optical fiber to a terminal tip of said cantilevered segment.

* * * * *